US006837947B2

(12) United States Patent
Lin et al.

(10) Patent No.: US 6,837,947 B2
(45) Date of Patent: Jan. 4, 2005

(54) LEAD-FREE SOLDER

(75) Inventors: Kwang-Lung Lin, Tainan (TW);
Kang-I Chen, Tainan (TW);
Shou-Chang Cheng, Tainan (TW);
Jia-Wei Huang, Tainan (TW)

(73) Assignee: National Cheng-Kung University, Tainan (TW)

( * ) Notice: Subject to any disclaimer, the term of this patent is extended or adjusted under 35 U.S.C. 154(b) by 107 days.

(21) Appl. No.: 10/045,004

(22) Filed: Jan. 15, 2002

(65) Prior Publication Data

US 2003/0133826 A1 Jul. 17, 2003

(51) Int. Cl.[7] .......................... B23K 35/00; C22C 13/00
(52) U.S. Cl. ...................... 148/400; 420/557; 420/560; 420/561; 420/562
(58) Field of Search .................. 148/400; 420/557, 420/560, 561, 562

(56) References Cited

U.S. PATENT DOCUMENTS

| | | | |
|---|---|---|---|
| 5,527,628 A | 6/1996 | Anderson et al. | 428/647 |
| 5,658,528 A | 8/1997 | Ninomiya et al. | 420/562 |
| 5,718,868 A | 2/1998 | Ninomiya et al. | 420/560 |
| 5,733,501 A | 3/1998 | Takao et al. | 420/562 |
| 5,762,866 A | 6/1998 | Jin et al. | 420/557 |
| 5,843,371 A | 12/1998 | Yoo et al. | 420/562 |
| 5,918,795 A | 7/1999 | Yamaguchi et al. | 228/200 |
| 5,958,333 A | 9/1999 | Matsunaga et al. | 420/562 |
| 5,993,736 A | 11/1999 | Matsunaga et al. | 420/557 |
| 6,319,461 B1 * | 11/2001 | Domi et al. | 420/557 |

FOREIGN PATENT DOCUMENTS

| | | | |
|---|---|---|---|
| JP | 2000015478 | * | 1/2000 |
| JP | 2000141078 | * | 5/2000 |
| JP | 2002018589 | * | 1/2002 |

OTHER PUBLICATIONS

D.L. Smith and H. J. Caul, *Alloys of Gallium With Powdered Metals As Possible Replacement For Dental Amalgum*, Journal American Dental Association, vol. 53, pp 315–324, 1956.

S.K. Bhattacharya and D.F. Baldwin, *Gallium Alloy Breakthrough For Via–Filling Application*, Advance Packaging, Sep. 2000, pp 61–64.

* cited by examiner

*Primary Examiner*—Sikyin Ip
(74) *Attorney, Agent, or Firm*—Bacon & Thomas

(57) ABSTRACT

This invention discloses a lead-free Sn—Zn—Al—Ag solder alloy, which is composed of 7–10 wt % of Zn, up to 0.5 wt % of Al, up to 4.0 wt % of Ag, and the balance of Sn; and a lead-free Sn—Zn—Al—Ag—Ga solder alloy, which is composed of 7–10 wt % of Zn, up to 0.5 wt % of Al, up to 4.0 wt % of Ag, up to 4.0 wt % of Ga; and the balance of Sn. The lead-free solder alloys of the present invention have better tensile strength and elongation than the conventional Sn—Pb solder alloys. In addition, the lead-free solder alloys of the present invention have a melting point lower than 200° C., which is close to the 183.5° C. of an eutectic Sn—Pb alloy.

2 Claims, 4 Drawing Sheets

LEAD-FREE SOLDER

FIELD OF THE INVENTION

The present invention relates to a lead-free solder, particularly a Sn—Zn—Ag—Al tetra-element lead-free solder, and a Sn—Zn—Ag—Al—Ga penta-element lead-free solder.

BACKGROUND OF THE INVENTION

As known by the industry, the main component of a typical solder alloy material is a Pb—Sn alloy. Lead is harmful to a human body and will cause an environmental contamination. Therefore, researches on a lead-free solder material are imperative. A Sn—Ag eutectic alloy has a tensile strength higher than that of a conventional Pb—Sn alloy, but has a high melting point of about 221° C., which is much higher than the melting point (183.5° C.) of a Pb—Sn eutectic alloy. Therefore, such an alloy will cause an increase in the cost of facility. Furthermore, a high temperature is liable to cause a breakdown on the electric elements. Many patents try to reduce the melting point of a Sn—Ag eutectic alloy by adding a small amount of other alloy components, e.g. Cu, Zn, Bi, In and Sb, into a tri-element, tetra-element or penta-element system mainly consisting of a Sn—Ag eutectic alloy. Some of their melting points are still higher than 200° C. Even though the addition of a large amount of Bi and In can reduce the melting point of the alloy, the cost of the alloy has been dramatically increased. For example: Sn—Ag—Cu, U.S. Pat. No. 5,527,628 (1996); Sn—Ag—Zn—Bi, U.S. Pat. No. 5,993,736 (1999); Sn—Ag—Bi—In, U.S. Pat. No. 5,958,333 (1999), U.S. Pat. No. 5,843,371 (1998), U.S. Pat. No. 5,658,528(1997); Sn—Ag—Bi—Cu—In, U.S. Pat. No. 5,918,795 (1999); Sn—Ag—In—Bi—Sb, U.S. Pat. No. 5,733,501 (1998); Sn—Ag—Zn—In—Bi, U.S. Pat. No. 5,762,866 (1998).

SUMMARY OF THE INVENTION

One objective of the present invention is to provide a lead-free Sn—Zn-based solder, which has mechanical properties (e.g. tensile strength and elongation) comparable or better than those of a conventional Pb—Sn eutectic alloy, has a low cost, and has a melting point lower than 200° C., or even lower than the melting point of a Pb—Sn eutectic alloy (183.5° C.). Therefore, it will not cause a damage to an IC encapsulation element.

Another objective of the present invention is to provide a lead-free Sn—Zn-based solder alloy, which has a high wetting power.

In order to achieve the above-mentioned objectives, a lead-free solder according to the present invention comprises 7.0–10.0 wt % of Zn, 0.1–4.0 wt % of Ag, 0.01–0.5 wt % of Al, and the balance of Sn.

Preferably, a lead-free solder according to the present invention further comprises 0.1–4.0 wt % of Ga. That is the lead-free solder comprises 7.0–10.0 wt % of Zn, 0.1–4.0 wt % of Ag, 0.01–0.5 wt % of Al, 0.1–4.0 wt % of Ga, and the balance of Sn.

Preferably, a lead-free solder according to the present invention comprises 0.25–0.5 wt % of Ga.

Preferably, a lead-free solder according to the present invention comprises 0.25–0.5 wt % of Ag.

DETAILED DESCRIPTION OF THE INVENTION

Figure 1:
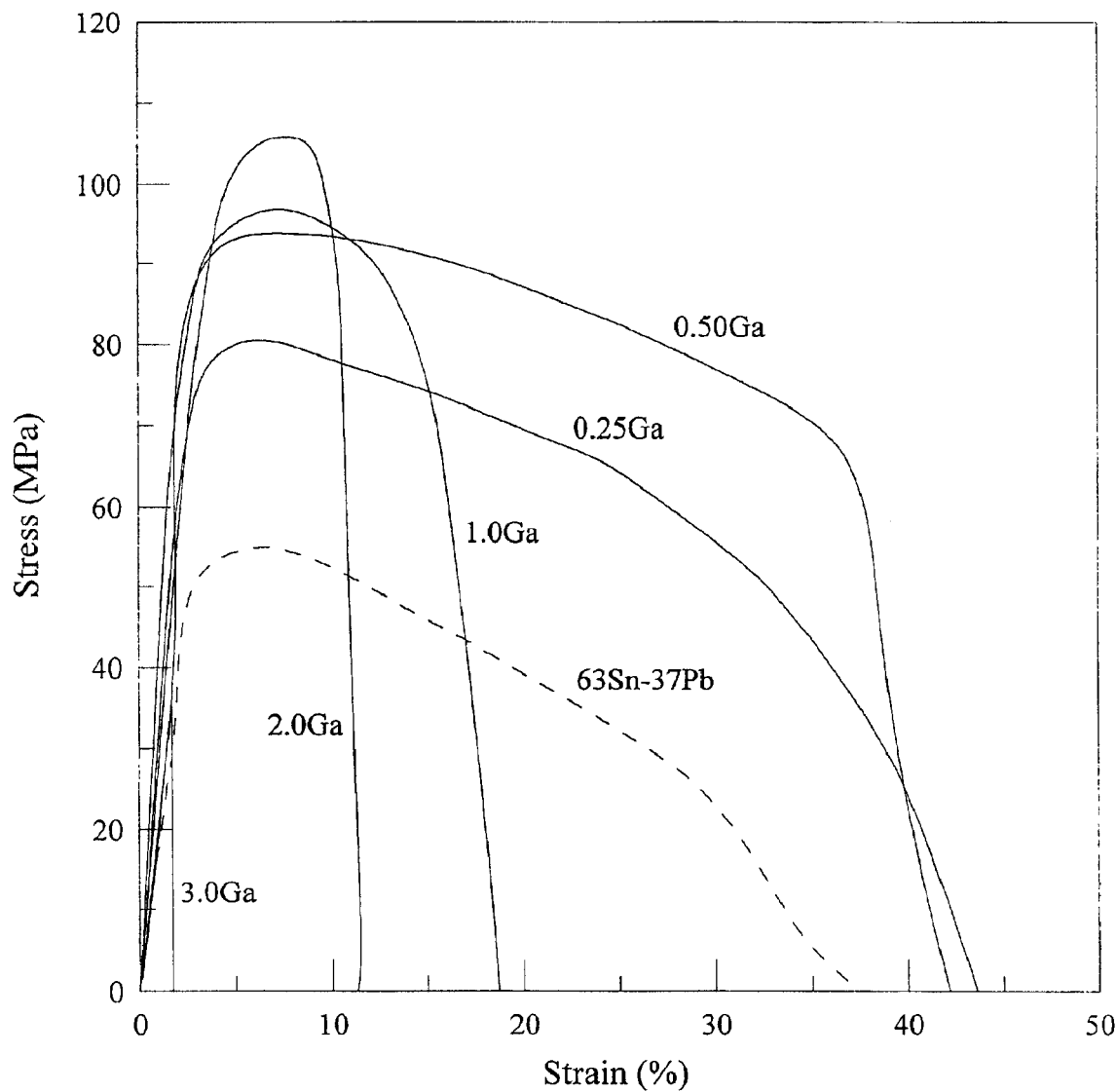
FIG. 1 shows the stress-strain curve of a Sn-8.55Zn-0.45Al-0.5Ag-yGa solder alloy according to the present invention and a conventional 63Sn-37Pb solder alloy.

The present invention discloses an improved lead-free solder, which comprises Zn, Ag and more than 75 wt % of Sn, which is characterized in that said solder further comprises 0.01–0.5 wt % of Al. It has been discovered in the present invention that the addition of Al into a Sn—Zn—Ag solder alloy can improve the wetting properties of the solder alloy.

An improved lead-free solder according to the present invention, preferably, further comprises 0.1–4.0 wt % of Ga. The gallium (Ga) alloy element mainly is to reduce the melting point of the alloy (Ga having a melting point of 29.8° C.) because Ga is solid soluble in Sn, Zn, Ag and Al.

The addition of a small amount of Ga will not form a compound, and can strengthen the solid solution. Furthermore, Ga has other properties, e.g. a low vapor pressure, high heat and electric conductivity, capable of wetting most of the metals and oxides. Therefore, Ga is suitable for the electric encapsulation industry. [D. L. Smith and H. J. Caul, "Alloys of Gallium with Powdered Metals as Possible Replacement for Dental Amalgam," J. Amer. Dent. Assoc. vol. 53, pp315–324, 1956; S. K. Bhattacharya and D. F. Baldwin, "Gallium Alloy Breakthrough for Via-filling Application," Adv. Packaging Sept. pp.61–64, 2000].

The lead-free solder according to the present invention mainly comprises Sn—Zn—Ag—Al and Sn—Zn—Ag—Al—Ga systems. The lead-free solder at least comprises more than 75 wt % of Sn, 7.0–10.0 wt % of Zn, 0.1–4.0 wt % of Ag, 0.01–0.5 wt % of Al, and 0–4.0 wt % of Ga. Ga mainly forms a solid solute in the Sn base. Ag and Zn form the compounds of $AgZn_3$ and $Ag_5Zn_8$. The addition of Ga not only can maintain the elongation of the Sn—Zn eutectic alloy, but also can increase the tensile strength thereof for about 18%. In comparison with a conventional 63Sn-37Pb eutectic alloy, a lead-free solder according to a preferred embodiment of the present invention has a tensile strength about 68% higher than that of a 63Sn-37Pb alloy, and has an elongation about 40% higher than that of a 63Sn-37Pb alloy.

The present invention can be further understood by the following examples which are for illustrative purposes only and not for limiting the scope of the present invention.

CONTROL EXAMPLE

The preparation of a Sn-9 wt % Zn eutectic alloy comprised measuring about 30 g of particles of pure metal of Sn and Zn with a purity of 99.99%; mounting the particles in a quartz tube; sealing the tube with the flame of a mixture gas of oxygen and liquefied petroleum gas; withdrawing gas from the tube to form a vacuum in the tube, filling the tube with Ar gas, wherein the quartz tube has an inside diameter of 8 mm and an outside diameter of 10 mm; mounting the sealed quartz tube in a high temperature furnace; heating the furnace to 800° C. and maintaining the temperature for 3 hours, and cooling off the furnace, wherein the rate of temperature increase and decrease is 1° C./min; after the furnace having been cooled to 250° C., cooling the tube with water. According to the ASTM Designation: E8–82 testing method, the alloy ingot was processed into an elongation test bar by a desktop lathe. The dimensions of the test bar are 16 mm in gauge length and 4 mm in gauge diameter. The elongation rate is 0.9 mm/min (0.015 mm/s). The ultimate tensile strength (UTS) of the alloy is 78.2 MPa, and the elongation of the alloy is 41.3%. The alloy has a melting point of 198.3° C.

Example 1

The preparation of the elongation test specimen of a Sn-8.55%Zn-1.0%Ag-zAl series solder alloy and the testing method thereof were the same as the control example. The results indicate that the addition of a small amount of Al (0.01~0.45 wt %) greatly increases its wetting capability on a Cu based substrate. The experimental results indicate that, when heated to 250° C., the Sn-8.55%Zn-1%Ag-zAl series solder alloy has a wetting capability of about 0.75–1.20 mN under the aid of DMAHCl organic flux. This wetting capability is about one to two times the wetting capability of a Sn-9Zn eutectic solder alloy (~0.41 mN). Regarding the wetting time, the wetting time of a Sn-8.55% Zn-1% Ag-zAl series solder alloy is about 0.9~1.1 seconds which is much better than the wetting time of a Sn—Zn eutectic series solder alloy (~1.32 seconds).

Example 2

The preparation of the elongation test specimen of a Sn-8.55% Zn-0.45% Al-0.5% Ag-0.25% Ga alloy and the testing method thereof were the same as the control example. The results indicate that: the ultimate tensile strength (UTS) is 80.4 MPa which is about 46% higher than the tensile strength of a 63Sn-37Pb alloy; the elongation is 43.6% which is about 16% higher than the elongation of a 63Sn-37Pb alloy. The melting point of the alloy is 195.55° C. which is very close to the melting point of a 63Sn-37 Pb (183.5° C.).

Example 3

The preparation of the elongation test specimen of a Sn-8.55% Zn-0.45% Al-0.5% Ag-0.5% Ga alloy and the testing method thereof were the same as the control example. The results indicate that: the ultimate tensile strength (UTS) is 92.5 MPa which is about 68% higher than the tensile strength of a 63Sn-37Pb alloy; the elongation is 42.2% which is about 12% higher than the elongation of a 63Sn-37Pb alloy. The melting point of the alloy is 194.7° C.

A stress-strain curve of a Sn-8.55Zn-0.45Al-0.5Ag-yGa solder alloy was obtained by repeating the steps of Example 2 and Example 3, as shown in FIG. 1. FIG. 1 also shows the stress-strain curve of a 63Sn-37Pb alloy of the control example.

Example 4

The preparation of the elongation test specimen of a Sn-8.55% Zn-0.45% Al-0.25% Ag-0.5% Ga alloy and the testing method thereof are the same as the control example. The results indicate that: the ultimate tensile strength (UTS) is 82.1 MPa which is about 49% higher than the tensile strength of a 63Sn-37Pb alloy; the elongation is 52.7% which is about 40% higher than the elongation of a 63Sn-37Pb alloy. The melting point of the alloy is 195.09° C.

Example 5

The preparation of the elongation test specimen of a Sn-8.55% Zn-0.45% Al-1.0% Ag-0.5% Ga alloy and the testing method thereof were the same as the control example. The results indicate that: the ultimate tensile strength (UTS) is 86.8 MPa which is about 58% higher than the tensile strength of a 63Sn-37Pb alloy. The melting point of the alloy is 194.1° C.

Figure 2:
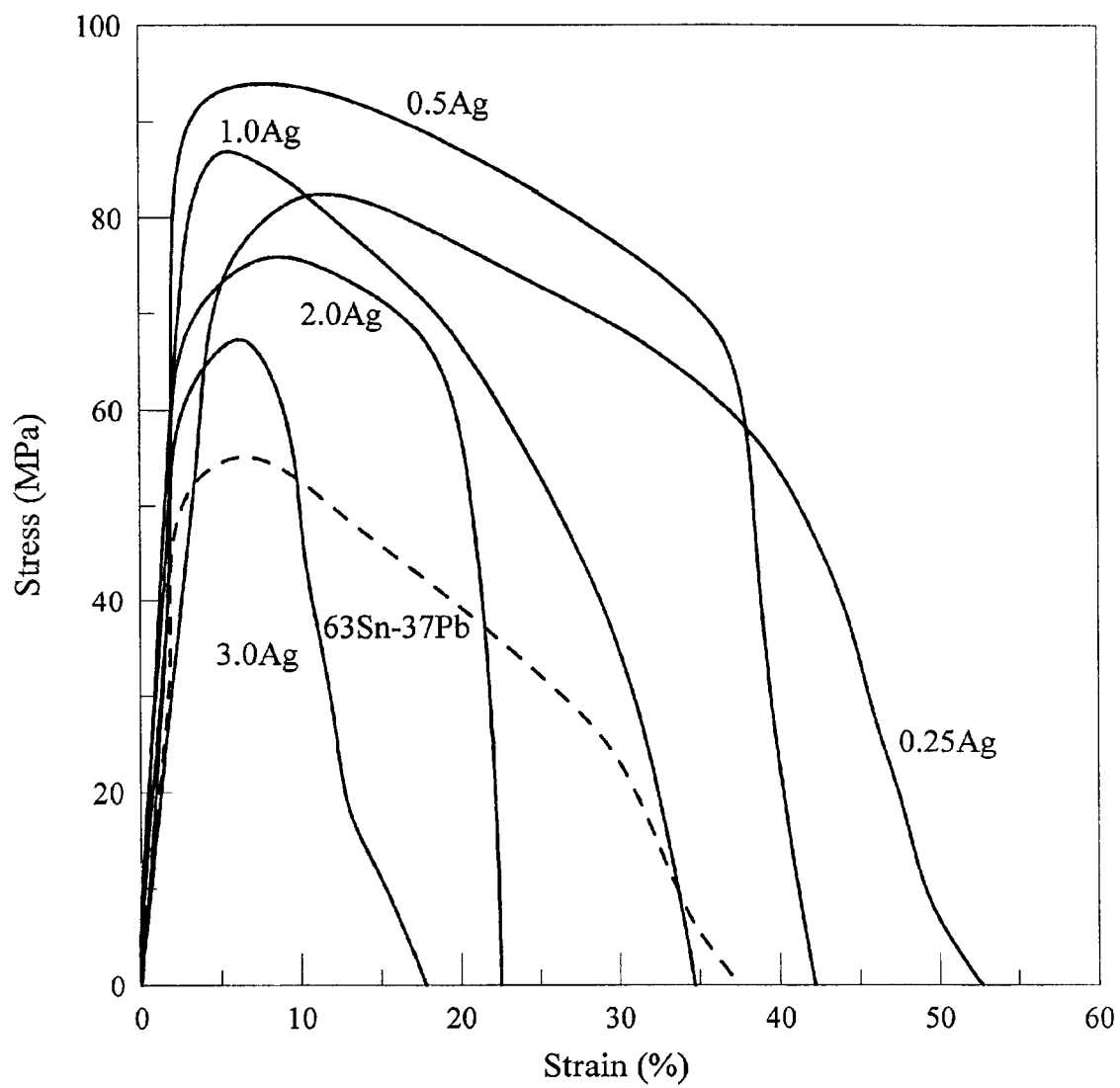
FIG. 2 shows the stress-strain curve of a Sn-8.55Zn-0.45Al-xAg-0.5Ga solder alloy according to the present invention and a conventional 63Sn-37Pb solder alloy.

A stress-strain curve of a Sn-8.55Zn-0.45Al-xAg-0.5Ga solder alloy was obtained by repeating the steps of Example 4 and Example 5, as shown in FIG. 2. FIG. 2 also shows the stress-strain curve of a 63Sn-37Pb alloy of the control example.

Figure 3:
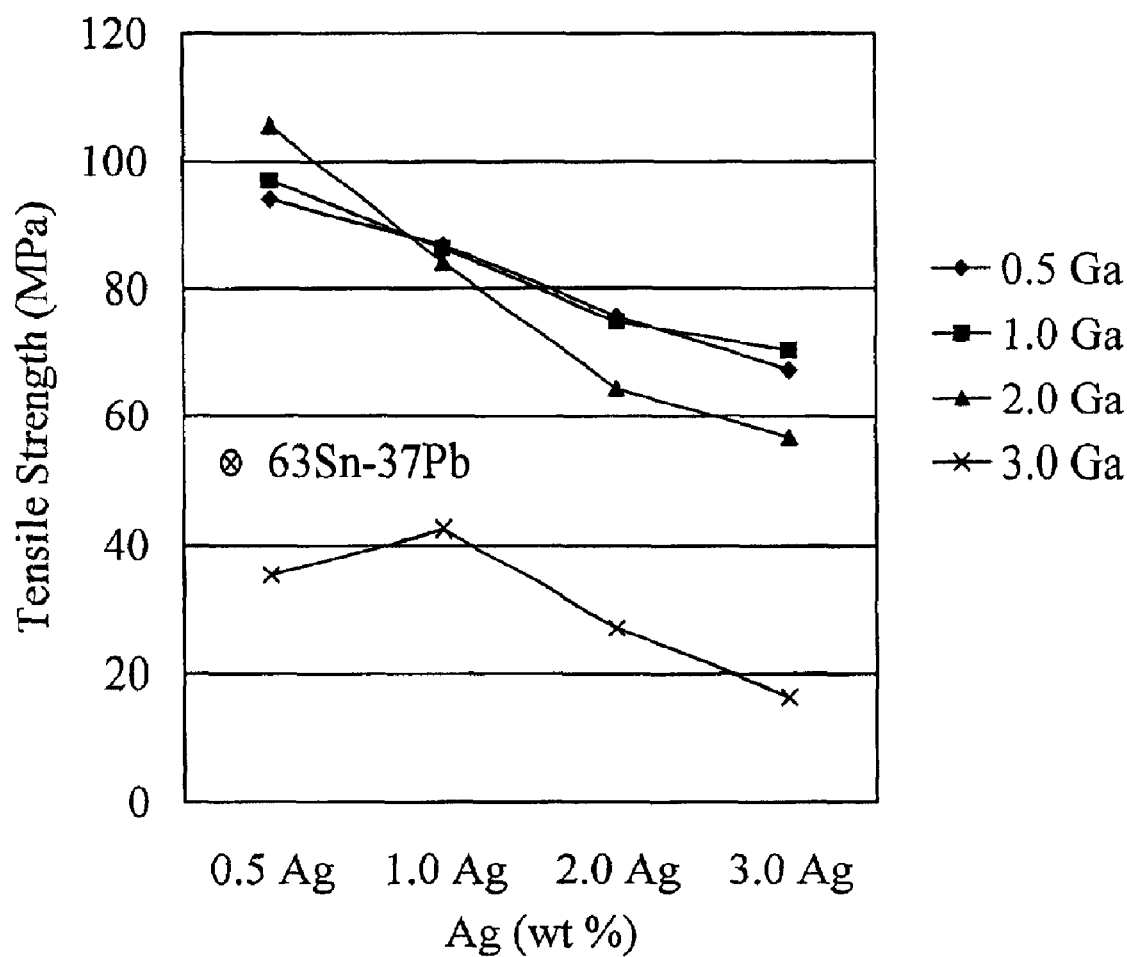
FIG. 3 shows the tensile strength of a Sn-8.55Zn-0.45Al-xAg-yGa solder alloy according to the present invention, wherein the rhomboid represents 0.5 wt % of Ga, the rectangle represents 1.0 wt % of Ga, the triangle represents 2.0 wt % of Ga, and X represents 3.0 wt % of Ga.
Figure 4:
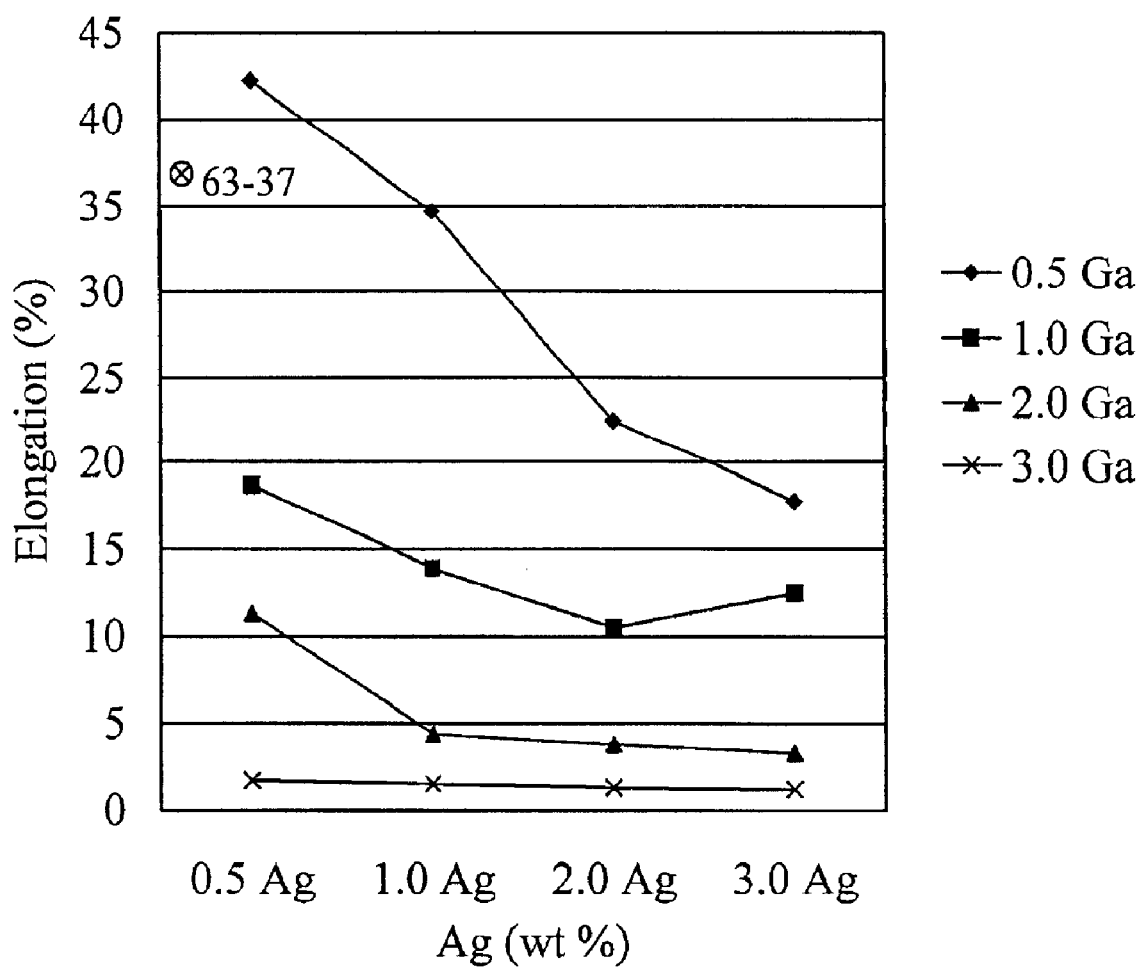
FIG. 4 shows the elongation of a Sn-8.55Zn-0.45Al-xAg-yGa solder alloy according to the present invention, wherein the rhomboid represents 0.5 wt % of Ga, the rectangle represents 1.0 wt % of Ga, the triangle represents 2.0 wt % of Ga, and X represents 3.0 wt % of Ga.

The mechanical properties of the Sn-8.55Zn-0.45Al-xAg-yGa solder alloys in other examples according to the present invention are shown in FIG. 3 and FIG. 4.

Although the present invention has been described with reference to specific details of certain embodiments thereof, it is not intended that such details should be regarded as limitations upon the scope of the invention except as and to the extent that they are included in the accompanying claims. Many modifications and variations are possible in light of the above disclosure.

What is claimed is:

1. A lead-free solder consisting essentially of 7.0–10.0 wt % of Zn, 0.25–0.5 wt % of Ag, 0.01–0.5 wt % of Al, 0.1–4.0 wt % of Ga, and the balance of Sn.

2. The solder as claimed in claim 1 further comprising 0.25–0.5 wt % of Ga.

* * * * *